(12) United States Patent
Kuo et al.

(10) Patent No.: US 9,835,818 B2
(45) Date of Patent: Dec. 5, 2017

(54) LENS DRIVING APPARATUS WITH WIRE ACCOMMODATING RECESS

(71) Applicant: TDK TAIWAN CORP., Yangmei, Taoyuan County (TW)

(72) Inventors: Chen-Chi Kuo, Yangmei (TW); Shou-Jen Liu, Yangmei (TW); Kun-Shih Lin, Yangmei (TW); Fu-Yuan Wu, Yangmei (TW)

(73) Assignee: TDK TAIWAN CORP., Yangmei, Taoyuan County (TW)

( * ) Notice: Subject to any disclaimer, the term of this patent is extended or adjusted under 35 U.S.C. 154(b) by 93 days.

(21) Appl. No.: 14/948,944

(22) Filed: Nov. 23, 2015

(65) Prior Publication Data

US 2016/0313532 A1 Oct. 27, 2016

(30) Foreign Application Priority Data

Apr. 27, 2015 (TW) .............................. 104113371 A

(51) Int. Cl.
| | |
|---|---|
| *G02B 7/02* | (2006.01) |
| *G02B 15/14* | (2006.01) |
| *G02B 7/04* | (2006.01) |
| *G02B 27/64* | (2006.01) |

(52) U.S. Cl.
CPC ............. *G02B 7/04* (2013.01); *G02B 27/646* (2013.01)

(58) Field of Classification Search
CPC . G02B 7/08; G02B 7/021; G02B 3/00; G02B 25/001; G02B 15/173; G02B 7/102; G02B 25/002; G02B 7/04; G02B 7/023; G02B 7/02; G02B 27/30; G11B 7/0932; G11B 7/0935
USPC ........ 359/811–830, 642–643, 676, 694, 696, 359/697, 698, 808, 641
See application file for complete search history.

(56) References Cited

U.S. PATENT DOCUMENTS

2012/0008220 A1* 1/2012 Lee .......................... G03B 3/10 359/822

* cited by examiner

*Primary Examiner* — Dawayne A Pinkney
(74) *Attorney, Agent, or Firm* — Locke Lord LLP; Tim Tingkang Xia, Esq.

(57) ABSTRACT

The present invention provides a lens driving apparatus including: a driving coil for driving a lens holder; and a leaf spring configured to absorb an impact on the lens holder; wherein the driving coil is electrically connected to the leaf spring, and a particularly bent portion and a recess for accommodating the bent portion are provided at a joint where the driving coil and the leaf spring are connected so as to improve the mechanical stability of the apparatus.

10 Claims, 6 Drawing Sheets

LENS DRIVING APPARATUS WITH WIRE ACCOMMODATING RECESS

RELATED APPLICATIONS

This application claims priority to Taiwan Application Serial Number 104113371, filed on Apr. 27, 2015, which is incorporated by reference herein in its entirety.

BACKGROUND

Technical Field

The present invention relates to a lens driving apparatus, and more particularly, to a lens driving apparatus with a wire accommodating recess.

Description of Related Art

In recent years, camera modules have been applied to various devices, and more particularly to portable devices. Optical imaging stabilization (OIS) lens modules and voice coil motor (VCM) lens modules have increasingly been installed in portable devices to serve as webcams, imaging lenses, and etc. An OIS lens module enables an adjustment in an imaging path of a view-taking lens via the active mechanism thereof so as to stabilize the imaging formation performance under unstable environment while the VCM architecture provides the focusing function.

A VCM lens module mainly comprises a lens and a driving apparatus coupled to the lens. During the process in which the lens performs the imaging operation (i.e. an image is being projected onto a light sensing element), the distance measuring mechanism of the driving apparatus enables the driving apparatus to drive the lens according to different object distances so that the lens or lens elements in the lens (even other imaging components) will be forced to move to a proper position, thereby achieving the focusing effect.

The driving apparatus can have a variety of design configurations. For example, a driving apparatus can comprise a driving coil, a magnet, a Hall sensor and/or a control circuit, wherein the driving coil can be integrated into a lens (or integrated into a component linked to the lens), and the magnet can be disposed in proximity to, but not in contact with, the driving coil so that a magnetic field at least partially covers the driving coil. According to the design of a lens or the manner in which the driving force is presented, there are a variety of potential options for the contours, locations and numbers of the driving coil and the magnetic. The Hall sensor can be disposed at a proper location (e.g. on the lens) so as to sense a change in the magnetic field caused by the displacement of the lens. The control circuit transmits a driving signal to the driving coil based on the sensing result of the Hall sensor, thereby driving the lens with the generated electromagnetic force.

The abovementioned driving coil and control circuit are electrically connected. Generally, either an OIS lens module or a VCM lens module comprises at least one leaf spring disposed on a path along which the lens moves so as to limit a movable range of the lens and to provide buffering. The leaf spring is generally made of an electrically conductive material (e.g. metal), thus a signal may be transmitted from the control circuit to the driving coil via the leaf spring. An electrically conductive path between the driving coil and the leaf spring is established by welding one end of the wire from which the driving coil is formed to a contact pad on the leaf spring so as to form an electrical connection therebetween. The leaf spring is designed to reduce an impact on the lens. However, when the magnitude of an impact exceeds to a certain extent, the conjugate structure of the mechanically joined wire and leaf spring is insufficient to withstand an excessively large pulling force, as a result, the wire would break and disengage from the leaf spring. Therefore, the driving apparatus of the lens would break down due to a drastic impact.

In order to ensure the electrical connection between the driving coil and the leaf spring even when a drastic impact acts upon the driving apparatus of the lens, one of the problems to be solved relates to the manner in which the wire is connected and the design of the supporting mechanism.

SUMMARY

An object of the present invention is to provide a lens driving apparatus with a wire accommodating recess having a smaller wire tension and a buffering area in response to an impact.

In order to accomplish the abovementioned object, the present invention provides a lens driving apparatus, including: a lens holder accommodating at least one lens; a driving coil having two ends and secured to an external surface of the lens holder; and a leaf spring having a first part and a second part, which are respectively electrically connected to one end and the other end of the driving coil, and partially secured to the external surface of the lens holder; wherein the one end of the driving coil has a bent portion, and the external surface of the lens holder defines a recess at a location corresponding to the bent portion so as to accommodate the bent portion; and wherein a bending direction of the bent portion is determined by the location of the recess of the lens holder.

The mechanical design of the present invention reduces the extent of tension of the wire structure. Therefore, the wire can be prevented from breaking due to the increased tension when acted upon by an impact. Moreover, the wire may be shaken when acted upon by an impact. The recess of the lens holder provides a buffering space for the bent portion so as to prevent the breaking of the bent portion, which may bump against the lens holder when violently impacted. In other words, the mechanical design of the present invention endows the lens driving apparatus with a better mechanical stability and ensures the stability of the circuit.

The foregoing aspects and other aspects of the present invention will be fully described with exemplary embodiments below by reference to the appended drawings.

DETAILED DESCRIPTION

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated on the appended drawings and limited thereto.

The First Embodiment

Figure 1A:
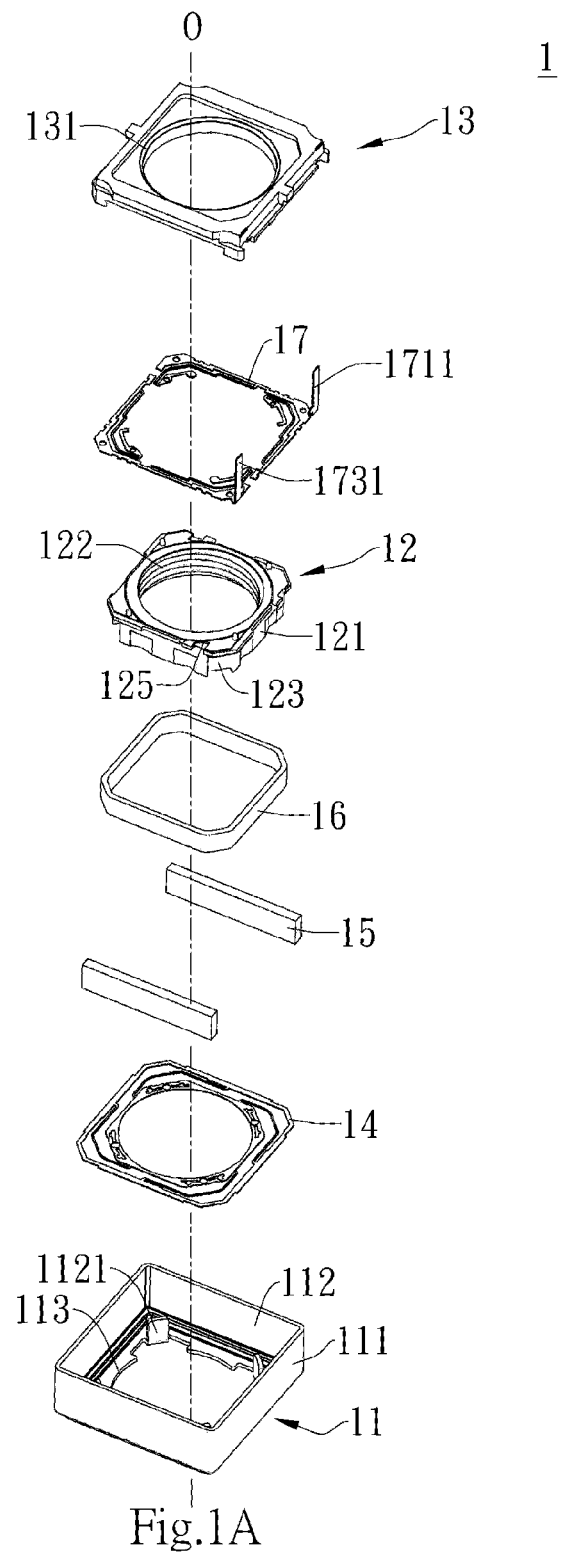
FIG. 1A is an exploded view of a lens driving apparatus in accordance with a first embodiment of the present invention.
Figure 1B:
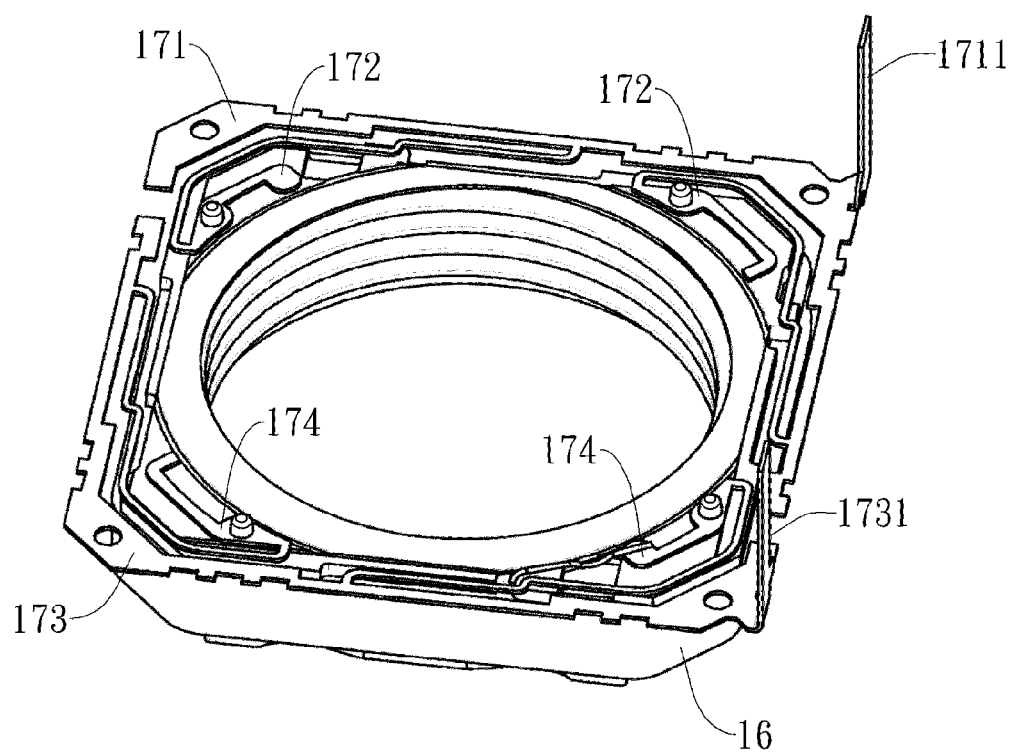
FIG. 1B is a perspective view showing the assembly of a portion of the components illustrated in FIG. 1A.
Figure 1C:
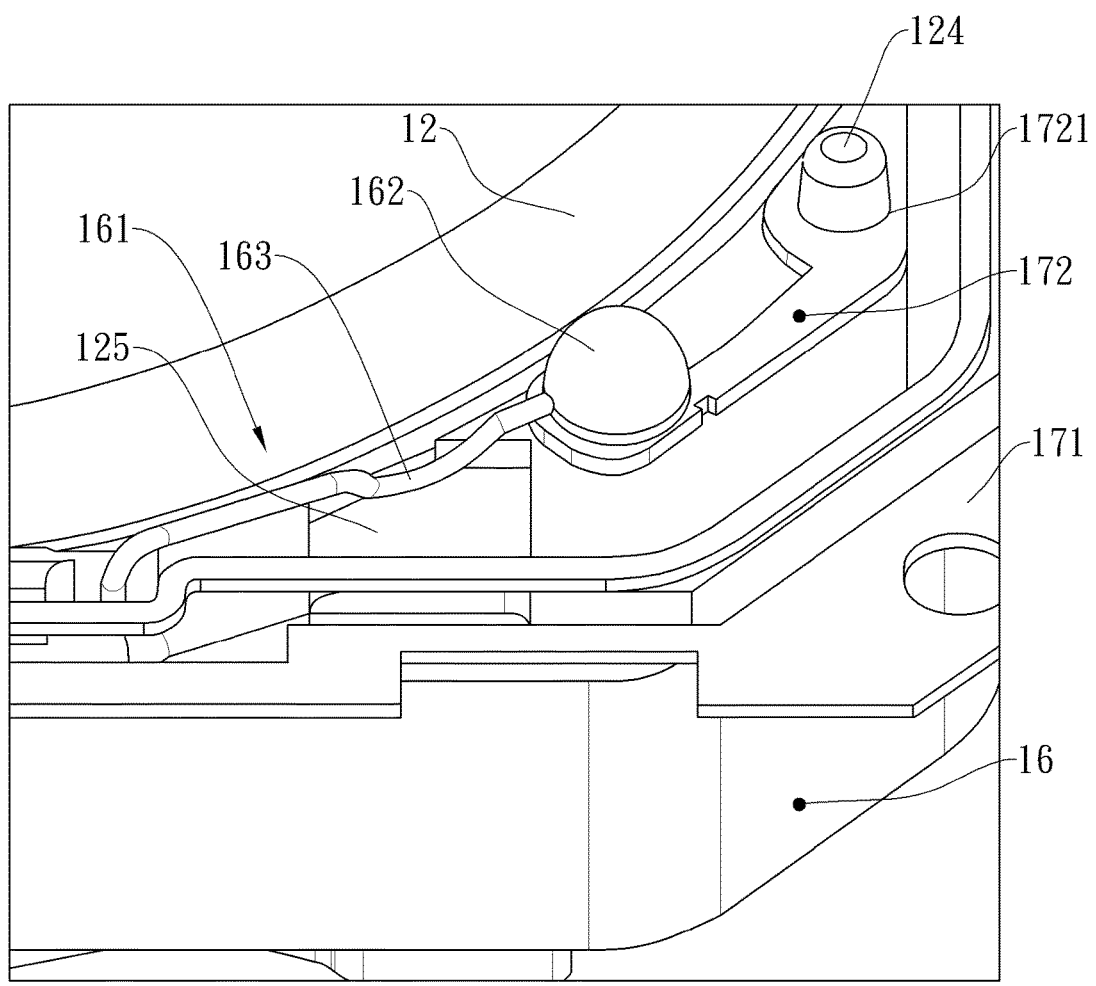
FIG. 1C is an enlarged partial view of the assembled components shown in FIG. 1B.

FIGS. 1A through 1C illustrate a lens driving apparatus with a wire accommodating recess in accordance with a first embodiment of the present invention. FIG. 1A is an exploded view of a lens module 1 comprising the lens driving apparatus in accordance with the first embodiment of the present invention. Referring to FIG. 1A, the lens module 1 mainly comprises a housing 11, a lens holder 12, a base 13 and a lens driving apparatus. Detailed features of each component will be described below.

The housing 11 has an external surface 111 and an internal surface 112. The internal surface 112 of the housing 11 defines an accommodation space for accommodating other components. An image-capturing aperture 113 is defined on one side of the housing 11 and configured to have an aperture diameter sufficient to capture light. The housing 11 and the accommodation space thereof are substantially rectangular but are not limited thereto. A plurality of protruding teeth 1121 may extend from the internal surface 112 of the housing 11 and further extend into the housing 11 from an edge of the image-capturing aperture 113 to serve as position-limiting elements within the accommodation space, as will be described below.

The lens holder 12 is a substantially annular mechanism having an external surface 121 and an internal surface 122. The internal surface 122 of the lens holder 12 defines a lens accommodation space which is capable of securely accommodating at least one lens (not shown). The at least one lens determines that the lens module 1 has an optical axis O. As shown in FIG. 1A, raised patterns (e.g. threads) (not shown) may be formed on the internal surface 122 of the lens holder 12 so that the lens can be accommodated in the accommodation space by mechanical joining. Alternatively, an optical adhesive can be used to secure the at least one lens in the accommodation space. As shown in FIG. 1A, a plurality of receiving portions 123 can be formed on the external surface 121 of the lens holder 12 and the locations thereof correspond to the locations of the plurality of protruding teeth 1121 on the internal surface 112 of the housing 11. The receiving portion 123 has a structure substantially resembling a sliding rail and in a direction substantially parallel to the optical axis O. By causing the plurality of protruding teeth 1121 to respectively slide into the plurality of receiving portions 123, the lens holder 12 can be securely accommodated in the accommodation space of the housing 11 without rotating with respect to the housing 11.

The base 13 has a structure substantially resembling a substrate. The base 13 can be joined with the housing 11 via a common mechanical structure to corresponds to the lens holder 12 so as to enclose the lens holder 12 within the housing 11 and the base 13, thereby forming the main architecture of the lens module 1. The base 13 defines a light exit hole 131 in a direction along the optical axis O to permit the light focused by the lens to pass therethrough and be projected onto a light-sensing element (not shown).

The lens module 1 further comprises an upper leaf spring 14, a plurality of magnets 15, a driving coil 16, and a lower leaf spring 17 (which are assembled for a VCM mechanism). The upper leaf spring 14 and the lower leaf spring 17 are arranged at two sides of the lens holder 12, respectively. The upper leaf spring 14 is disposed between the housing 11 and the lens holder 12 while the lower leaf spring 17 is disposed between the base 13 and the lens holder 12. The upper leaf spring 14 has a shape substantially matching that of the accommodation space of the housing 11. The structure of the lower leaf spring 17 will be described below. When the lens holder 12 moves along the optical axis O, the flexibility of the leaf springs, which are in contact with the lens holder 12, can restrict the movement of the lens holder 12 and absorb the impact on the lens holder 12. The plurality of magnets 15 are disposed between the housing 11 and the lens holder 12 without abutting against the lens holder 12. For example, the plurality of magnets 15 can be secured to the internal surface 112 of the housing 11 and properly spaced from the external surface 121 of the lens holder 12. The driving coil 16 can be formed by winding a wire into a substantially annular body and installed onto the external surface 121 of the lens holder 12 without interfering in the reception of the plurality of protruding teeth 1121 in the plurality of receiving portions 123 of the lens holder 12. The driving coil 16 is also properly spaced from the plurality of magnets 15. In other embodiments, there can be at least one driving coil disposed at at least one side of the lens holder 12. The driving coil 16, the lower leaf spring 17 and the lens holder 12 constitute a portion of the lens driving apparatus in this embodiment, and the connection relation thereof will be described below.

FIG. 1B is a perspective view showing the assembly of the lens holder 12, the driving coil 16 and the lower leaf spring 17 illustrated in FIG. 1A. The lower leaf spring 17 mainly consists of a first frame portion 171, a plurality of first gripping portions 172, a second frame portion 173 and a plurality of second gripping portions 174. The first frame portion 171 and the plurality of first gripping portions 172 constitute a first part of the lower leaf spring 17, and the second frame portion 173 and the plurality of second gripping portions 174 constitute a second part of the lower leaf spring 17. The first frame portion 171 and the second frame portion 173 are configured to have shapes substantially resembling that of the accommodation space of the housing 11. A first pin 1711 is formed at one side of the first frame portion 171, and a second pin 1731 is formed at one side of the second frame portion 173. The first frame portion 171 is in contact with the second frame portion 173 so as to enable the lower leaf spring 17 to have two electrically conductive paths.

Referring back to FIG. 1A, the first pin 1711 and the second pin 1731 extend toward the base 13. After the components of the lens driving apparatus have been assembled, the first frame portion 171 and the second frame portion 173 are secured to the base 13 with the first pin 1711 and the second pin 1731 bypassing the periphery of the base 13 (not shown). The first pin 1711 and the second pin 1731 are configured to electrically connect to output terminals (not shown) of a circuit, such as the anode and cathode. This circuit can be a control circuit for driving a lens, which is capable of outputting control signals according to specific conditions and transmitting these signals to the lower leaf spring 17 via the first pin 1711 and the second pin 1731.

Referring again to FIG. 1B, the plurality of first gripping portions 172 and the plurality of second gripping portions 174 respectively extend inward from the first frame portion 171 and the second frame portion 173 to form curved arms, and respective one ends thereof are securely connected to the lens holder 12 (the manner in which the plurality of first gripping portions 172 and the plurality of second gripping portions 174 are secured will be described below), thereby enabling the lens holder 12 and the base 13 to be elastically connected.

FIG. 1C is an enlarged partial view of a first gripping portion 172 illustrated in FIG. 1B. The first gripping portion 172 has a joining hole 1721 corresponding to a protruding post 124 on the lens holder 12, and the rest of gripping portions also have the same structure, thereby the plurality of first gripping portions 172 and the plurality of second gripping portions 174 can be securely connected to the lens holder 12. A wire is wound to form the driving coil 16, and the two ends thereof (only one end 161 is illustrated in the drawing) are electrically connected to one of the plurality of first gripping portions 172 and one of the plurality of second gripping portions 174, respectively. Generally, the one end 161 of the wire is secured to one end of the first gripping portion 172 via a welding point 162 (the other end of the wire is secured to one end of the second gripping portion 174 in the same manner). Accordingly, with the two transmission paths of the lower leaf spring 17, control signals can be further transmitted to the driving coil 16 via the welding point(s) 162.

The above arrangement is applicable to the upper leaf spring 14. In the first embodiment, the lower leaf spring 17 is configured to provide electrically conductive paths, but the present invention is not limited thereto. In sum, in the first embodiment, the leaf spring has a flat surface, one end and/or the other end of the driving coil are/is parallel to the flat surface and extend(s) to the gripping portion(s), and the bent portion is arranged to the one end and/or the other end parallel to the flat surface.

It is to be noted that the one end 161 of the wire in this embodiment has a bent portion 163 at a section thereof in proximity to the welding point 162, and that the lens holder 12 defines a recess 125 facing the bent portion 163. However, the recess 125 can be omitted in some embodiments. The bent portion 163 has a substantially arcuate shape so that a section of the wire can extend into and be received within the recess 125. Although not shown in the drawing, the lens holder 12 defines another recess at a location corresponding to the other end of the wire, which is also provided with another bent portion at a location corresponding to the another recess. The recesses of the lens holder 12 can be formed during the injection molding process. While the bent portion 163 has an arcuate shape in the first embodiment of the present invention, it is not limited thereto and can be formed by using a special tool to bend the wire (in a direction along the recess 125) into a specific shape (e.g. the shape described in the second embodiment of the present invention). In other embodiments, bent portions can be formed at a plurality of sections of the wire to reduce the tension born by the wire.

Compared with the prior art techniques, the bent portion 163 of the wire in the first embodiment reduces the extent of tension of the wire. Therefore, with the bent portion 163, the wire can be prevented from breaking due to the increased tension when acted upon by an impact. Moreover, the recess 125 of the lens holder 12 provides a buffering space for the bent portion 163 so as to prevent the probability that the bent portion 163 may bump against the lens holder 12 and break when violently impacted. The arrangement of the recess 125 can increase the buffering distance between the bent portion 163 and the lens holder 12 and thereby to prevent a short circuit at the lens driving apparatus caused by the breaking of the wire due to the collision therebetween. In other words, the improved means described in the first embodiment enhances the mechanical stability for the electrical connection for the driving coil.

The Second Embodiment

Figure 2A:
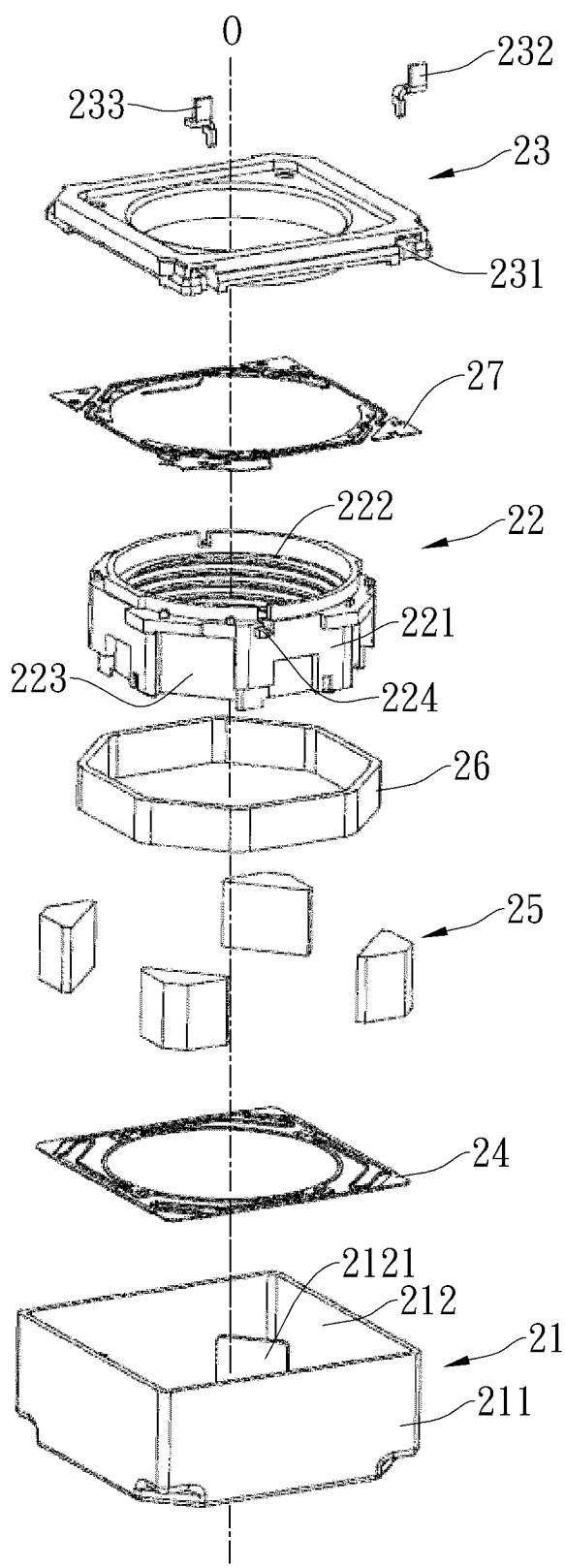
FIG. 2A is an exploded view of a lens driving apparatus in accordance with a second embodiment of the present invention.

The lens driving apparatus with a wire accommodating recess of the present invention is also applicable to lens modules of different designs. FIG. 2A is an exploded view showing a lens module 2 comprising a lens driving apparatus in accordance with a second embodiment of the present invention. The lens module 2 comprises a housing 21, a lens holder 22 and a base 23, which are similar to those described in the first embodiment, thus similar structural features will not be repeated.

The housing 21 has an external surface 211 and an internal surface 212. The housing 21 and an accommodation space thereof are substantially rectangular but are not limited thereto. A plurality of protruding teeth 2121 may extend from the internal surface 212 of the housing 21 and further extend into the housing from an edge of an image-capturing hole (not shown) of the housing 21 to serve as position-limiting elements for the lens holder 22.

The lens holder 22 is a substantially annular mechanism having an external surface 221 and an internal surface 222. The internal surface 222 of the lens holder 22 defines a lens accommodation space which is capable of securely accommodating at least one lens (not shown). The at least one lens determines that the lens module 2 has an optical axis O. A plurality of receiving portions 223 may be formed on the external surface 221 of the lens holder 22 and the locations thereof correspond to the locations of the plurality of protruding teeth 2121 in the housing 21. By causing the plurality of protruding teeth 2121 to respectively slide into the plurality of receiving portions 223, the lens holder 22 can be securely accommodated in the accommodation space of the housing 21 without rotating with respect to the housing 21.

The base 23 has a structure substantially resembling a substrate and can be mechanically joined with the housing 21 to enclose the lens holder 22 within the housing 21, thereby forming the main architecture of the lens module 2. Two slots 231 are defined at one side of the base 23. The two slots 231 have specific shapes so as to securely accommodate a first pin 232 and a second pin 233 having corresponding shapes, respectively.

The lens module 2 further comprises an upper leaf spring 24, a plurality of magnets 25, a driving coil 26, and a lower leaf spring 27 (in which are assembled as a VCM mechanism). The upper leaf spring 24 and the lower leaf spring 27 are disposed at two sides of the lens holder 22 in a direction along the optical axis O so that the lens holder 22 is sandwiched in therebetween. The flexible leaf springs provide buffering to the lens holder 22 and absorb an impact on the lens holder 22. The plurality of magnets 25 are secured to the corners inside the housing 21 without abutting against the lens holder 22. The driving coil 26 can be formed by winding a wire into a substantially annular body and installed onto the external surface 221 of the lens holder 22 without interfering in the reception of the plurality of protruding teeth 2121 of the housing 21 in the plurality of receiving portions 223 of the lens holder 22. The driving coil 26 is also properly spaced from the plurality of magnets 25. The driving coil 26, the lower leaf spring 27 and the lens holder 23 constitute a portion of the lens driving apparatus in this embodiment, and the connection relation thereof will be described below.

Figure 2B:
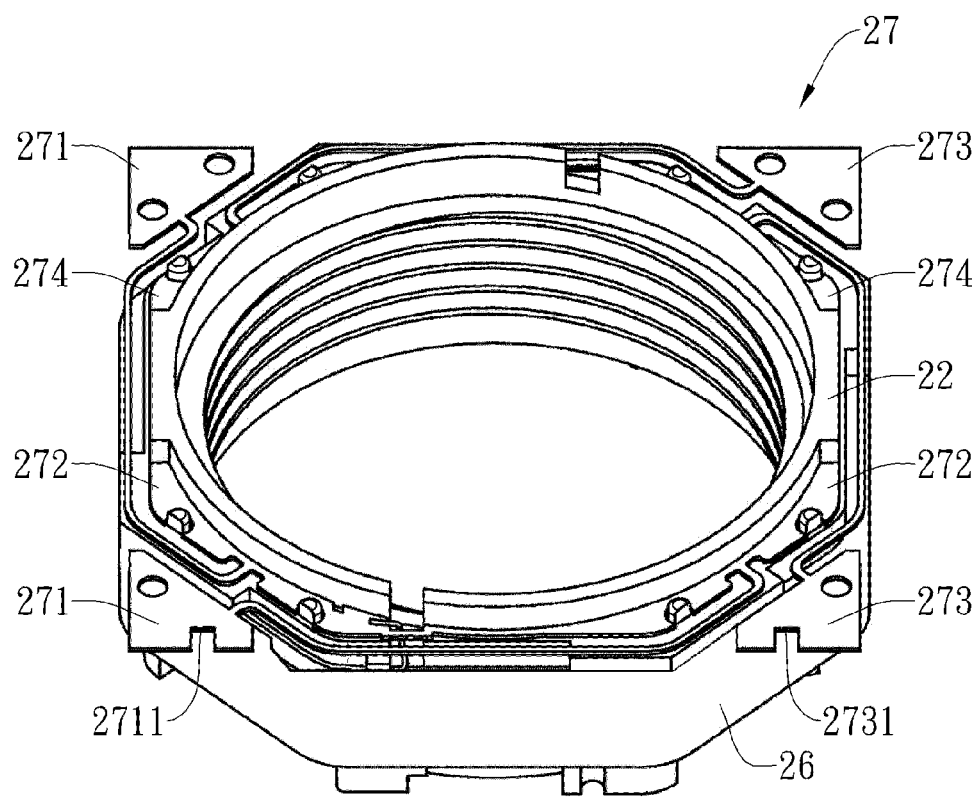
FIG. 2B is a perspective view showing the assembly of a portion of the components illustrated in FIG. 2A.

FIG. 2B is a perspective view showing the assembly of the lens holder 22, the driving coil 26, and the lower leaf spring 27 in a sequential order. The lower leaf spring 27 mainly consists of two first frame portions 271, a first gripping portion 272, two second frame portions 273 and a second gripping portion 274. The first frame portions 271 and the first gripping portion 272 constitute a first part of the lower leaf spring 27, and the second frame portions 273 and the second gripping portion 274 constitute a second part of the lower leaf spring 27. Regarding the lower leaf spring 27, the first part is in contact with the second part so that the lower leaf spring 27 has two electrically conductive paths. The first frame portions 271 and the second frame portions 273 are configured into a substantially frame-shaped structure. The first frame portions 271 and the second frame portions 273 can be secured to the base 23 via a mechanical mechanism (e.g. a securing mechanism). The first frame portions 271 and the second frame portions 273 are spaced apart from each other. One of the two first frame portions 271 and one of the two second frame portions 273 respectively define a first notch 2711 and a second notch 2731 (not shown). After the base 23 has been mounted, the first pin 232 and the second pin 233 snugly fit the first notch 2711 and the second notch 2731, respectively, so as to form electrical connection.

The first gripping portion 272 and the second gripping portion 274 respectively extend inward from the first frame portion 271 and the second frame portion 273 to form curved arms and contact one surface of the lens holder 22. The first gripping portion 272 and the second gripping portion 274 have specific geometric structures so as to grip the lens holder 22, thereby enabling the lens holder 22 and the base 23 to be elastically connected.

Figure 2C:
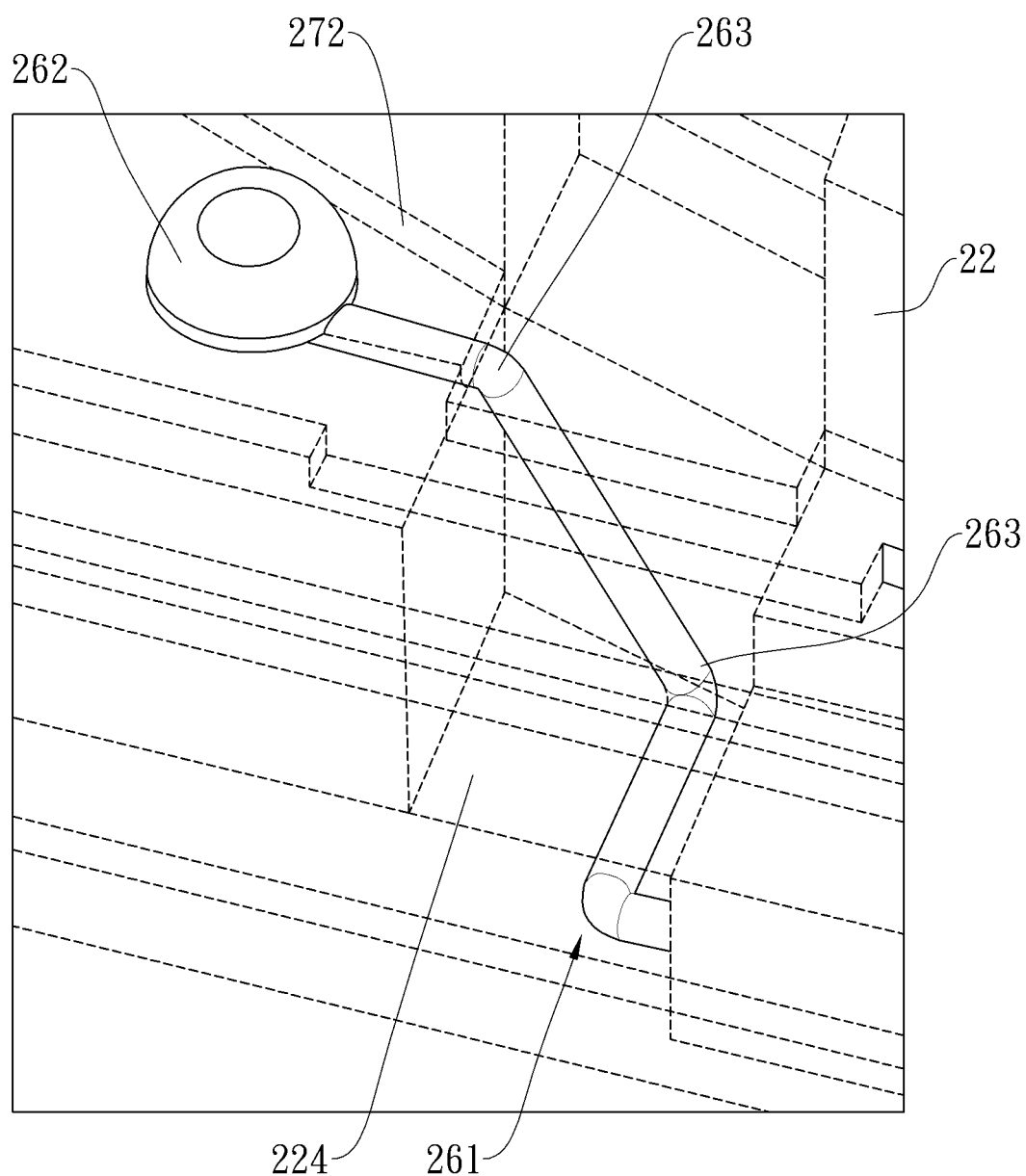
FIG. 2C is an enlarged partial view of the assembled components shown in FIG. 2B.

The driving coil 26 has two ends respectively connected to the first gripping portion 272 and the second gripping portion 274 of the lower leaf spring 27. FIG. 2C shows that one end 261 of a wire from which the driving coil 26 is formed is electrically connected with the first gripping portion 272 via a welding point 262. Accordingly, control signals transmitted by the lower leaf spring 27 can be further transmitted to the driving coil 26 via the welding point 262.

In the second embodiment, like the first embodiment, the one end 261 of the wire has a bent portion 263 at a section thereof in proximity to the welding point 262, and the lens holder 22 defines a recess 224 corresponding to the bent portion 263. The direction in which the recess 224 curves determines a bending direction of the bent portion 263. Although not shown in the drawing, the lens holder 22 defines another recess at a location corresponding to the other end of the wire, which is also provided with a bent portion corresponding to the another recess. Referring to FIG. 2C, the wire is first bent toward the recess 224 after extending from the driving coil 26 (so that the wire can partially extend into the recess 224) and then is bent along the wall surface and extends toward the first gripping portion 272. It is to be noted that the abovementioned bends are created using a special tool rather than being formed naturally.

In the second embodiment, while only one end of the driving coil is described, the two ends of the driving coil can have the same configuration. The configuration of the lower leaf spring 27 is applicable to the upper leaf spring 24. In the second embodiment, the lower leaf spring 27 is configured to provide electrically conductive paths, but the present invention is not limited thereto. In sum, in the second embodiment, the leaf spring has a flat surface, and one end and/or the other end of the driving coil extend(s) along the recesses/recess to the flat surface with the bent portions/bent portion disposed between the flat surface and the driving coil. In other embodiments of the present invention, the lower leaf spring may consist of more than two leaf spring pieces (not shown), but should at least comprise the first part and the second part which can electrically connect the one end and the other end of the driving coil, respectively.

In the second embodiment, like the first embodiment, the bent portion 263 of the wire reduces the extent of tension of the wire. Therefore, with the bent portion 263, the wire can be prevented from breaking due to the increased tension when acted upon by an impact. Moreover, the recess 224 of the lens holder 22 further provides a buffering space for the bent portion 263 so as to prevent the probability that the bent portion 263 may bump against the lens holder 22 and break when violently impacted. The recess 224 can increase a buffering distance between the bent portion 263 and the lens holder 22 so as to prevent a short circuit at the lens driving apparatus caused by the breaking of the wire due to the collision therebetween.

To sum up, in the lens driving apparatus with a wire accommodating recess of the present invention, the recess determines in which way one end of the wire is bent to be coupled to the leaf spring. The bent portion can reduce the tension of the wire. Accordingly, the wire's capability of withstanding an impact can be improved and this endows the lens driving apparatus with a better circuit/mechanical stability. Although an exemplary VCM lens module is adopted in the embodiments of the present invention, the present invention is not limited thereto. An OIS lens module is applicable within the spirit of the present invention without departing from the scope of the present invention.

The preferred embodiments of the lens driving apparatus with a wire accommodating recess of the present invention have been described by reference to the appended drawings. All the features disclosed herein can be combined with other methods, and every feature disclosed herein can be optionally replaced with a feature with the same, equivalent or similar effect. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention without departing from the scope of the claims can be made by a person skilled in the art.

What is claimed is:

1. A lens driving apparatus, comprising:
    a lens holder having an external surface and accommodating at least one lens;
    a driving coil having two ends and securely attached to the external surface of the lens holder; and
    a leaf spring having a first part and a second part and partially secured to the external surface of the lens holder, the first part and the second part electrically connect with one end and the other end of the driving coil, respectively;
    wherein the one end of the driving coil has a bent portion; and
    wherein a recess is formed on the external surface of the lens holder at a location corresponding to the bent portion for accommodating the bent portion, the recess is formed inward from the external surface to which the driving coil is attached.

2. The lens driving apparatus of claim 1, wherein the leaf spring has a flat surface, the one end of the driving coil is parallel to the flat surface and extends to the leaf spring, and the bent portion is arranged at the one end parallel to the flat surface.

3. The lens driving apparatus of claim 1, wherein the leaf spring has a flat surface, and the one end of the driving coil extends along the recess to the flat surface with the bent portion disposed between the flat surface and the driving coil.

4. The lens driving apparatus of claim 1, wherein the one end of the driving coil has another bent portion accommodated in the recess.

5. The lens driving apparatus of claim 1, wherein the other end of the driving coil has another bent portion and the lens holder has another recess in which the another bent portion is accommodated.

6. The lens driving apparatus of claim 1, wherein a bending direction of the bent portion is determined by the location of the recess of the lens holder.

7. The lens driving apparatus of claim 1, wherein the leaf spring comprises a first frame portion, a first gripping portion, a second frame portion and a second gripping portion, and the first gripping portion and the second gripping portion respectively extend from the first frame portion and the second frame portion and are securely connected to the lens holder; and wherein the first frame portion and the first gripping portion constitute a first part of the leaf spring and the second frame portion and the second gripping portions constitute a second part of the leaf spring.

8. The lens driving apparatus of claim 1, wherein the bent portion of the driving coil is suspended within the recess.

9. The lens driving apparatus of claim 1, wherein the lens holder includes:
 a first surface,
 a second surface parallel to the first surface,
 a third surface extending between the first and the second surfaces, and
 a fourth surface extending between the first, second and third surfaces,
 wherein the recess is defined by the first surface, the second surface, the third surface and the fourth surface that are independent from the external surface to which the driving coil is attached.

10. The lens driving apparatus of claim 9, wherein the bent portion of the driving coil is suspended above the fourth surface.

* * * * *